Patented Sept. 23, 1941

2,256,500

UNITED STATES PATENT OFFICE 2,256,500

MANUFACTURE OF PREGNENDIONES

Arthur Serini, Berlin, Lothar Strassberger, Berlin-Wilmersdorf, and Adolf Butenandt, Berlin-Dahlem, Germany, assignors to Schering Corporation, Bloomfield, N. J., a corporation of New Jersey No Drawing. Application April 10, 1939, Serial No. 267,184. In Germany October 31, 1934

10 Claims. (Cl. 260—397.3)

This invention relates to the manufacture of pregnendiones. The present application is a continuation-in-part of our copending application Serial No. 39,804, filed September 9, 1935.

According to the present invention, pregnendiones having the physiological activity of substances obtainable from corporalutea are produced by oxidation of unsaturated hydroxyketones of the pregnane series, wherein the hydroxyl group is located at the 20-carbon atom and the keto group is formed of the 3-carbon, that is, compounds which may be designated as pregnenol-20-ones-3.

The pregnenol-20-ones-3, which are employed as starting materials for the present invention can be obtained in any desired manner, either by direct isolation from naturally occurring substances, or by synthetic processes, by the conversion of other compounds, for example, by the action of halogen upon pregnanol-20-ones-3 and splitting off of hydrogen halide from the so formed monohalogenated pregnanolones, as described in our above mentioned application.

Various oxidizing agents may be employed in our process, and particularly compounds of hexavalent chromium, like chromic acid anhydride and the like; further, the permanganate compounds of the alkali and alkaline earth metals may likewise be used. The hydroxy-ketones to be oxidized are advantageously employed in the form of their halogenated compounds. These halogenated compounds are prepared, for instance, by causing halogen to act upon the corresponding saturated hydroxy-ketones, the pregnanol-20-ones-3, as described in our above mentioned application, whereby saturated monohalogenated hydroxy ketones are obtained. One may also subject pregnenol-20-ones-3 to the action of halogen, whereby unsaturated halogenated compounds are obtained.

Furthermore, the oxidation of the pregnenol-20-ones-3 to pregnendiones can be carried out also with the aid of oxidizing metal oxides, such as copper oxide and the like, or with the aid of hydrogen peroxide.

We have found that the reaction conditions to be observed in carrying out the above described oxidation process may be similar to those described in Houben-Weyl, Methoden der organ. Chemie, volume 2, 2nd edition (1922), page 41 et seq.; and that the halogenation and splitting off of halogen or hydrogen halide can be accomplished in the manner described in Houben-Weyl, ibid., volume 2, page 763 et seq., and volume 3, 2nd edition (1923), page 909 et seq.

The oxidation of the pregnenol-20-ones-3 may be carried out directly, although the yields will ordinarily not be as good as those obtained by the oxidation of the saturated compounds, especially the monohalogenated compounds. For the direct oxidation, the less active oxidizing agents, like copper oxide, are in general preferred.

The reactions involved in the above described process are illustrated in the following structural equations in which X represents halogen:

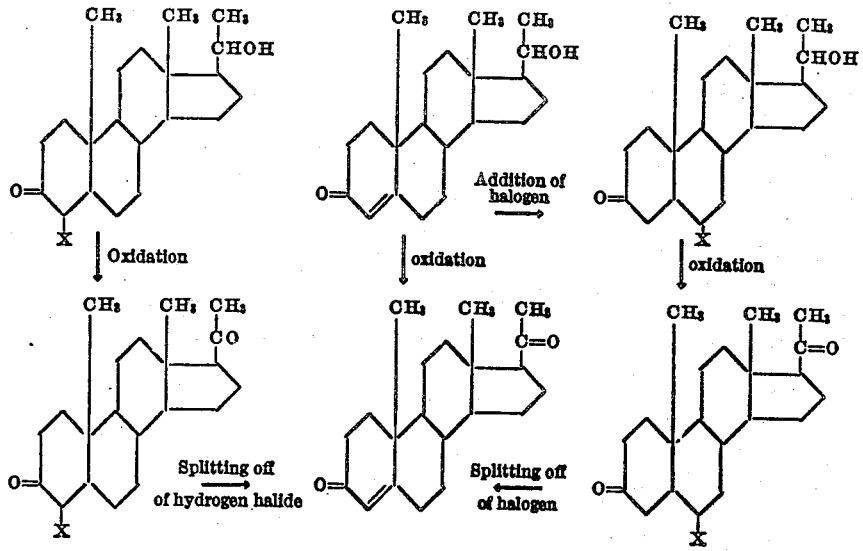

The invention will be further described with the aid of the following examples which are presented purely for purposes of illustration:

Example 1

7.1 gms. of pregnanol-(20)-one-(3) are dissolved in 100 ccs. of glacial acetic acid, to which solution there is added drop by drop a solution of 1.02 molecules of bromine in 12.5 ccs. of glacial acetic acid, i. e. a 4n bromine solution. On keeping the reaction mixture at room temperature it is decolorized after about 5 minutes. The reaction product is precipitated with water, filtered off and recrystallized from alcohol and from dilute acetone. The brominated pregnanolone forms fine needles having a silk-like luster and melting at 185° C. (with decomposition).

5 gms. of this product are dissolved in 200 ccs. of glacial acetic acid. To this solution there is added a solution in glacial acetic acid of an amount of chromic acid anhydride corresponding to 1.05 equivalents of oxygen. After allowing the reaction mixture to stand for 12 hours at room temperature, the reaction product is precipitated by means of water and recrystallized from alcohol and dilute acetone. Thereby the monobromo pregnandione of the melting point 186—187° C. (with decomposition) is obtained in small needles.

5 gms. of the latter are heated to boiling in 150 ccs. of anhydrous pyridine for 12 hours, the reaction product is precipitated with water after neutralization of the pyridine with dilute sulfuric acid, extracted with ether and recrystallized from its solution in dilute alcohol. It forms needles of the melting point 121° C. No depression in melting point is observed in a mixture with corpus luteum hormone.

On heating to the melting point, the needles are transformed into well-defined prisms which on determining the melting point, melt at 128° C. The melting point of the dioxime of both polymorphous modifications is at about 243° C. (with decomposition). The melting point of a mixture with dioxime of the corpus luteum hormone does not show any depression.

Example 2

500 mgs. of pregnanol-(20)-one-(3) acetate are dissolved in 4 ccs. of glacial acetic acid. To this solution 6 drops of a glacial acetic acid—hydrobromic acid mixture and, drop by drop, at 20° C. 0.7 cc. of a bromine—glacial acetic acid solution containing 1.05 molecule of bromine are added. Immediately decolorization of the bromine solution takes place. When the reaction is completed, the reaction product is precipitated by means of water and is recrystallized from alcohol. It crystallizes in colorless needles of the melting point 167° C.

310 milligrams of the brominated acetate are heated with 5 ccs. of anhydrous pyridine for 14 hours to boiling. The reaction solution is then concentrated by evaporation, neutralized with dilute sulfuric acid and extracted with ether. After drying the ethereal solution and evaporating the ether, an oily residue is obtained which is purified by dissolving it in a little alcohol and causing it to crystallize by cooling and rubbing with a glass rod. On recrystallization from pure and dilute alcohol the acetate of the unsaturated ketone is obtained in needles having a melting point of 138.5° C.

It is saponified to the unsaturated pregnanolone of the melting point 159° C. and oxidized to the unsaturated diketone pregnendione as described above.

Example 3

550 milligrams of monobromo pregnanol-(20)-one-(3) as obtained according to Example 1, is heated to boiling for 12 hours with 8 ccs. of anhydrous pyridine. The reaction solution is worked up as described for the corresponding acetate in Example 2. The unsaturated pregnenolone obtained crystallizes from alcohol in characteristic prisms, from dilute alcohol in needles, the melting point being 159° C., the optical rotation in absolute alcohol $[\alpha]_D 20° = +89.7$. It can be oxidized to the corresponding diketone, pregnendione, as described above.

Example 4

In the same manner as described in Example 1 there is obtained from allo-pregnanol-(20)-one-(3) by bromination, oxidation and splitting off of hydrobromic acid an unsaturated diketone, allo-pregnendione, which is isomeric with the corpus luteum and has a double bond between the C-atoms 1 and 2, as described hereinabove.

Example 5

The acetate of allo-pregnanol-(20)-one-(3) is brominated as described in Example 1 by means of bromine in glacial acetic acid. The acetylated monobromo compound is then saponified at room temperature with the calculated amount of 0.05% alcoholic potassium hydroxide solution. The bromo hydroxy-ketone obtained is then oxidized and worked up to the allo-pregnendione as described in the preceding example.

Example 6

A solution of 0.197 gm. of chlorine in 30 ccs. of chloroform is added, while stirring and cooling, to a solution of 1 gm. of allo-pregnanolone acetate in 50 ccs. of chloroform. After evaporating the chloroform the residue is heated with 10 ccs. of quinoline for 3 hours to 150—180° C. Thereupon it is poured into dilute sulfuric acid and extracted with ether. The residue obtained on evaporating the ether is heated with 25 ccs. of 1% alcoholic potassium hydroxide solution for 2 hours. After cooling it is poured into water, extracted with ether and the pregnenolone obtained is oxidized as described above, to the corresponding diketone, allo-pregnendione.

Example 7

A solution of pregnenol-20-one-3 in pure glacial acetic acid is mixed with chromium trioxide, dissolved in glacial acetic acid in such amounts as correspond to 3 atoms of hydrogen for 1 molecule of the hydroxy ketone. During mixing care is taken that the temperature does not surpass 15° C. The mixture is allowed to stand in an ice box for 1 to 2 days, thereupon diluted with water and extracted with ether. The ethereal solution is shaken with sodium carbonate solution in order to remove the acid portions; the remaining neutral compounds show on recrystallisation a melting point of 120–125° C.

Example 8

Pregnenol-20-one-3 is fused in a wide-mouthed test-tube at a bath temperature of 280–300° C. and 5 times its weight of finely powdered copper oxide, introduced in 3 to 4 portions. After 1 hour the reaction product is shaken repeatedly with anhydrous methyl alcohol, the solution treated in the cold with animal charcoal and the solvent is allowed to evaporate. Thereby about 15% of a product having a melting point of 120–125° C. are obtained.

*Example 9*

Pregnenolone is dissolved in 5% alcoholic caustic potash lye and treated slowly at bath temperature with 30% hydrogen peroxide, corresponding to 3 atoms of available oxygen for 1 molecule of the hydroxy ketone. The temperature is gradually increased, the excess of hydrogen peroxide removed by boiling and the reaction solution diluted with water and extracted with ether. The remaining oxidation product is worked up as described in Example 7 and yields a diketone of the formula $C_{21}H_{30}O_2$.

*Example 10*

A solution of brominated pregnenolone in glacial acetic acid, said brominated pregnenolone obtained by the action of bromine upon pregnenol-20-one-3 is oxidized by means of chromic acid—glacial acetic acid—solution. After allowing the reaction mixture to stand at about 20° C. for 48 hours the oxidation mixture is poured into water and extracted with ether. After washing and drying the ethereal solution it is evaporated to dryness with the addition of some zinc dust. The residue is mixed with further amounts of zinc dust and after the addition of glacial acetic acid heated for 10 minutes on the water bath. The solution is diluted with water, extracted with ether and the ethereal solution evaporated to dryness. The residue is recrystallised from dilute alcohol and yields pregnendione of melting point 128°.

The separation and isolation of the halogen-containing intermediate products and of the unsaturated end products can be accomplished not only in the manner described in the above examples, but also according to other methods of separation; thus the reaction mixture can be extracted with suitable solvents and the latter evaporated, or the formed compounds can be precipitated from their solutions with the aid of water or of organic solvents in which they are insoluble. They may also be converted into soluble or difficultly soluble condensation products, as with typical ketone reagents, such as semi-carbazide, thio-semi-carbazide, phenylhydrazine, hydroxylamine, and the like.

The purification of the intermediate and end products can be effected also by fractional or repeated crystallization, distillation, or sublimation.

The pregnendiones of the general formula $C_{21}H_{30}O_2$ obtainable according to the present invention represents valuable physiological substances; from the crude product obtained after the oxidation and dehalogenation there can be recovered on purification a crystallisate which appears to be identical with that of the composition $C_{21}H_{30}O_2$ which can be isolated from corpora lutea. This synthetic product shows also the same behavior as the natural product in that it appears in two different forms, one of melting point 121° C. and another of melting point 128.5° C.; further, it has the same physiological efficiency as the natural product obtained from corpora lutea. With regard to the method of testing of physiological efficiency, reference is had to Butenandt, Westphal and Hohlweg, Zeitschrift f. physiologische Chemie, vol. 227, page 84 (1934).

Variations from the specific procedures, proportions, and specific conditions of reaction may be resorted to within the scope of the appended claims without departing from the spirit of the invention.

What we claim is:

1. Process for the manufacture of pregnendiones of the general formula $C_{21}H_{30}O_2$, which comprises subjecting pregnenol-20-one-3 of the formula $C_{21}H_{32}O_2$ to the action of an oxidizing agent capable of converting a secondary alcohol group into a keto group.

2. Process for the manufacture of pregnendiones of the general formula $C_{21}H_{30}O_2$ which comprises subjecting pregnenol-20-one-3 of the formula $C_{21}H_{32}O_2$ to the action of a halogenating agent, reacting the resulting halogenated pregnenol-20-one-3 with an oxidizing agent capable of converting a secondary alcohol group into a keto group, and treating the oxidation product with an agent capable of splitting off the added halogen.

3. Process according to claim 1, wherein the oxidizing agent is a compound of hexavalent chromium.

4. Process according to claim 1, wherein the oxidizing agent is chromic acid anhydride.

5. Process according to claim 1, wherein the oxidizing agent is one which does not attack the nuclear double bond to any considerable extent.

6. Process according to claim 1, wherein the oxidizing agent is copper oxide.

7. A method for the production of pregnenol-20-ones-3, comprising reacting pregnanol-20-one-3 compounds of the structural formula

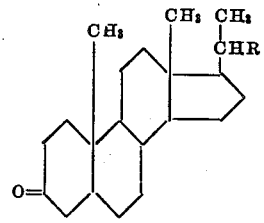

wherein R represents a group which upon hydrolysis is converted into the hydroxy group, with halogen, splitting off hydrogen halide from the monohalogeno compounds formed, and establishing the hydroxy group from the substituent group R.

8. A monohalogeno hydroxy ketone compound of the cyclopentano phenanthrene series, corresponding to the general formula $C_{21}H_{30}OHal(R)$ and the structural formula

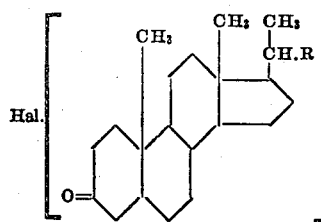

wherein Hal represents a halogen atom which takes the place of a hydrogen in the cyclopentano phenanthrene ring system, while R is a member of the group consisting of the hydroxy group and groups which on hydrolysis are transformed into a hydroxy group.

9. Monohalogens pregnanol-20-one-3.

10. An unsaturated ketone compound of the cyclopentano phenanthrene series corresponding to the general formula $C_{21}H_{31}O_2H$ and the structural formula
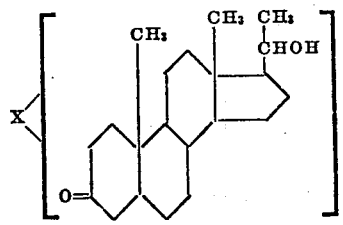
wherein —X— represents one —C=C— double bond in the phenanthrene nucleus of the ring system.
ARTHUR SERINI.
LOTHAR STRASSBERGER.
ADOLF BUTENANDT.